United States Patent
Kim

(10) Patent No.: US 11,816,006 B2
(45) Date of Patent: Nov. 14, 2023

(54) DATA ERROR DETECTION METHOD AND DISPLAY DEVICE INCLUDING THE SAME

(71) Applicant: Samsung Display Co., Ltd., Yongin-Si (KR)

(72) Inventor: Sang Kuk Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/740,225

(22) Filed: May 9, 2022

(65) Prior Publication Data
US 2023/0135139 A1    May 4, 2023

(30) Foreign Application Priority Data
Nov. 2, 2021    (KR) .......................... 10-2021-0148848

(51) Int. Cl.
| | | |
|---|---|---|
| G06F 11/00 | (2006.01) | |
| G06F 11/16 | (2006.01) | |
| G06F 11/32 | (2006.01) | |
| G06F 11/10 | (2006.01) | |
| G06F 11/07 | (2006.01) | |

(52) U.S. Cl.
CPC ........ *G06F 11/162* (2013.01); *G06F 11/0772* (2013.01); *G06F 11/1004* (2013.01); *G06F 11/327* (2013.01)

(58) Field of Classification Search
CPC ............. G06F 11/0772; G06F 11/1004; G06F 11/162; G06F 11/327
USPC ........................................................... 714/48
See application file for complete search history.

(56) References Cited

U.S. PATENT DOCUMENTS

| | | | |
|---|---|---|---|
| 9,235,466 B2 | 1/2016 | Sohn et al. | |
| 2019/0130845 A1* | 5/2019 | Han ........................ | G06F 3/041 |
| 2020/0184904 A1* | 6/2020 | Jung ..................... | G09G 3/2014 |
| 2021/0043121 A1* | 2/2021 | Jung ...................... | G09G 3/006 |

FOREIGN PATENT DOCUMENTS

| | | |
|---|---|---|
| CN | 107680554 A | 2/2018 |
| CN | 109994086 A | 7/2019 |
| KR | 10-2083498 B1 | 4/2020 |

* cited by examiner

*Primary Examiner* — Chae M Ko
(74) *Attorney, Agent, or Firm* — Innovation Counsel LLP

(57) ABSTRACT

A display device includes: a first memory storing compensation data and a display driver integrated chip including a compensator converting the input image data into output image data based on the compensation data. The display driver integrated chip includes: a second memory receiving the compensation data from the first memory when the display device is power-on; a third memory included in the compensator, the third memory storing the compensation data received from the second memory; and an error detector detecting an error in the compensation data stored in the third memory by comparing the compensation data stored in the first memory with the compensation data stored in the third memory.

20 Claims, 6 Drawing Sheets

DATA ERROR DETECTION METHOD AND DISPLAY DEVICE INCLUDING THE SAME

CROSS-REFERENCE TO RELATED APPLICATION

This application claims priority under 35 U.S.C. § 119 to Korean Patent Application No. 10-2021-0148848, filed in the Korean Intellectual Property Office on Nov. 2, 2021, the disclosure of which is incorporated by reference in its entirety.

BACKGROUND

1. Technical Field

The present disclosure generally relates to a data error detection method and a display device including the same.

2. Discussion of the Related Art

Electronic devices having an image display function, such as computers, tablet PCs, smartphones, and wearable electronic devices, may include display devices.

As resolution of display panels included in electronic devices such as mobile devices increase, the amount of transmission data is rapidly increasing. A serial interface such as a mobile industry processor interface (MIPI) is used to support high-resolution images. Research for compensating for high-resolution image data (or input image data) is also being conducted. Compensation driving for image data compensation may be performed in a display driver integrated chip (DDI) included in a display device.

The display device may store compensation data of image data necessary for compensation driving in external flash memory. The DDI may load compensation data of image data from the flash memory when the display device is power-on and write the loaded compensation data in an internal memory (or second memory). The compensation data written in the internal memory may be periodically written in a buffer (or third memory) by the logic unit.

Meanwhile, in a process in which the compensation data of the image data is written from the external flash memory to the buffer, an error may occur in the compensation data of the image data due to noise caused by Electro-Static Discharge (ESD).

SUMMARY

Embodiments provide a display device capable of determining whether an error has occurred in compensation data of image data, and recovering the compensation data of the image data when the error occurs.

In accordance with an aspect of the present disclosure, there is provided a display device including: a host configured to provide input image data; a first memory storing compensation data; and a display driver integrated chip including a compensator converting input image data into output image data based on the compensation data. The display driver integrated chip includes: a second memory receiving the compensation data from the first memory when the display device is power on; a third memory included in the compensator, the third memory storing the compensation data received from the second memory; and an error detector detecting an error in the compensation data stored in the third memory by comparing the compensation data stored in the first memory with the compensation data stored in the third memory.

The error detector may compare a first error correction code received from the first memory and a second error correction code generated based on the compensation data stored in the third memory in a predetermined cycle.

The first error correction code may be a first checksum of the compensation data stored in the first memory and the second error correction code is a second checksum of the compensation data stored in the third memory.

When the first checksum and the second checksum do not accord with each other, the error detector may generate a data rewriting signal instructing the compensation data to be re-loaded from the first memory to the second memory.

The error detector may compare a first error correction code received from the first memory and a second error correction code generated based on the compensation data stored in the third memory in response to an error detection signal from the host.

When the host detects that an electro-static discharge has occurred in the display driver integrated chip, the host may provide the error detection signal.

The display driver integrated chip may provide the output image data to a display panel a frame at a time.

The frame may include a porch period in which the output image data is not provided.

The third memory may include at least one buffer storing the compensation data.

A size of the compensation data stored in the at least one buffer may be set such that a time obtained by adding up a time required to calculate a second error correction code which is generated based on the compensation data stored in the third memory with respect to the compensate data written in the at least one buffer and a time required to re-load the compensation data from the first memory to be smaller than the porch period.

The error detector may perform both comparison of a first error correction code received from the first memory and a second error correction code generated based on the compensation data stored in the third memory and re-loading of the compensation data stored in the first memory in one porch period.

A size of the compensation data stored in the at least one buffer may be set such that a time required to calculate a second error correction code which is generated based on the compensation data stored in the third memory with respect to the compensate data written in the at least one buffer to be smaller than a frame period except the porch period.

The error detector may compare a first error correction code received from the first memory and a second error correction code generated based on the compensation data stored in the third memory in a first frame period, and performs re-loading of the compensation data stored in the first memory in a porch period included in a next frame of the first frame.

The first memory may calculate a first error correction code, corresponding to a size of the compensation data stored in the buffer The first memory may be a nonvolatile memory device and each of the second memory and the third memory may be a volatile memory device.

In accordance with another aspect of the present disclosure, there is provided a data error detection method for a display panel including: loading compensation data from a first memory to a second memory when the display device is power-on; loading the compensation data from the second memory to a third memory included in a compensator; and detecting an error in the compensation data stored in the third memory by comparing a first error correction code with respect to the compensation data stored in the first memory with a second error correction code with respect to the compensation data stored in the third memory.

The detecting the error in the compensation data stored in the third memory may include comparing the first error correction code and the second error correction code in a predetermined cycle.

The data error detection method may further include re-loading the compensation data from the first memory to the second memory when the first error correction code and the second error correction code do not accord with each other.

A frame which is displayed in the display panel may include a porch period in which output image data is not provided.

The third memory may include at least one buffer storing the compensation data loaded to the third memory. A size of the compensation data stored in the at least one buffer may be set such that a time obtained by adding up a time required to calculate the second error correction code with respect to the compensate data written in the buffer and a time required to re-load the compensation data from the first memory to be smaller than the porch period, or be set such that a time required to calculate the second error correction code with respect to the compensate data written in the buffer to be smaller than a frame period except the porch period.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
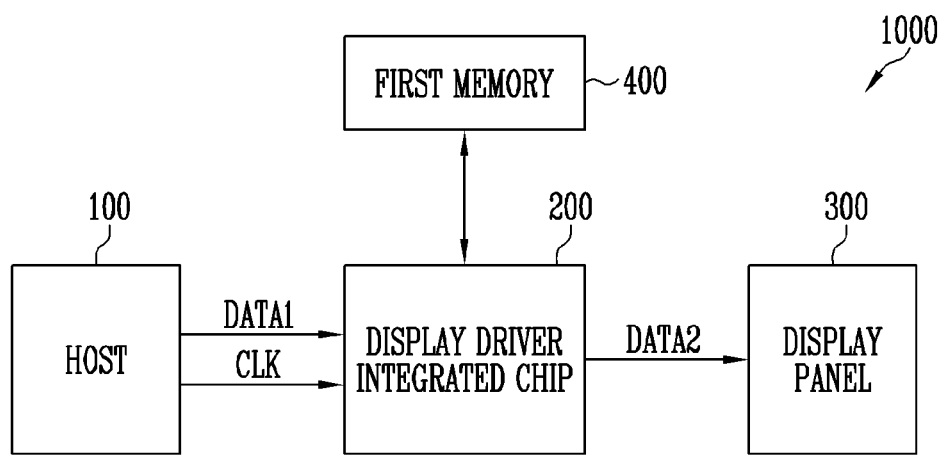
FIG. 1 is a block diagram schematically illustrating a configuration of a display device in accordance with the present disclosure.

The effects and characteristics of the present disclosure and a method of achieving the effects and characteristics will be clear by referring to the embodiments described below in detail together with the accompanying drawings. However, the present disclosure is not limited to the embodiments disclosed herein but may be implemented in various forms. In the entire specification, when an element is referred to as being "connected" or "coupled" to another element, it can be directly connected or coupled to the another element or be indirectly connected or coupled to the another element with one or more intervening elements interposed therebetween. A part irrelevant to the description will be omitted to clearly describe the present disclosure, and the same or similar constituent elements will be designated by the same reference numerals throughout the specification.

Hereinafter, exemplary embodiments of the present disclosure will be described with reference to the accompanying drawings.

Figure 2:
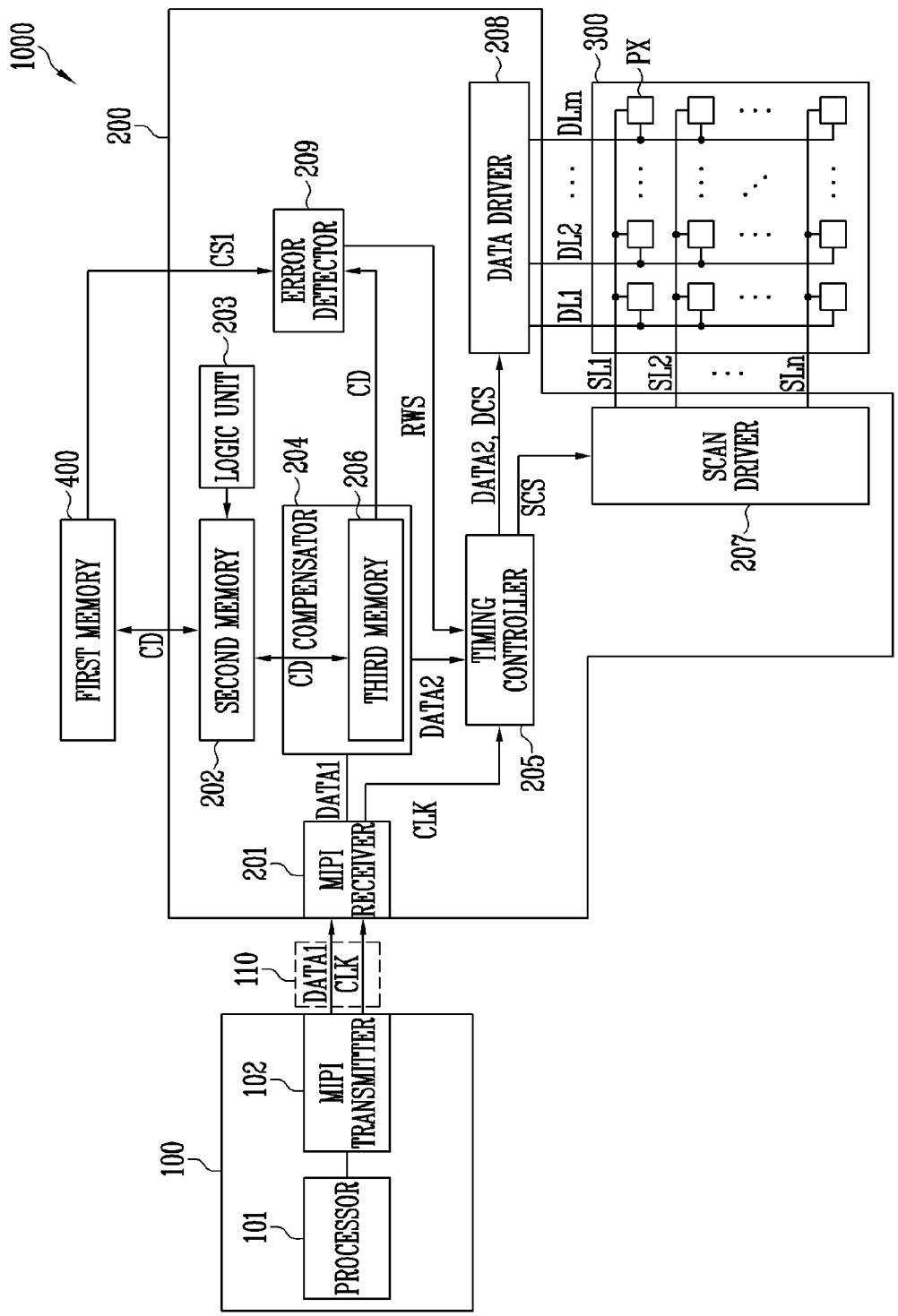
FIG. 2 is a block diagram illustrating in detail the configuration of the display device in accordance with the present disclosure.

FIG. 1 is a block diagram schematically illustrating a configuration of a display device in accordance with the present disclosure. FIG. 2 is a block diagram illustrating in detail the configuration of the display device in accordance with the present disclosure.

Referring to FIGS. 1 and 2, the display device 1000 in accordance with the present disclosure may include a host 100, a display driver integrated chip 200, a display panel 300, and a first memory 400.

The host 100 may control an operation of the display driver integrated chip 200. In an embodiment, the host 100 may be implemented as an integrated circuit, a System on Chip (SoC), an Application Processor (AP), or a mobile AP. The host 100 may include a processor 101 and a Mobile Industry Processor Interface (MIPI) transmitter 102.

The processor 101 may control an operation of the MIPI transmitter 102. The processor 101 may process input image data and provide processed input image data DATA1 to the display driver integrated chip 200 through the MIPI transmitter 102.

The MIPI transmitter 102 may mean a terminal provided to transmit data from the host 100 to the display driver integrated chip 200 according to a MIPI standard. The MIPI transmitter 102 may transmit the processed input image data DATA1 processed by the processor 101 to the display driver integrated chip 200.

The MIPI transmitter 102 may include one clock lane module and one or more data lane modules. In the present disclosure, an example in which the host 100 includes the MIPI transmitter 102 is described. However, the host 100 may include a transmitter using various standards such as a Mobile Display Digital Interface (MDDI) display port and an embedded display port, in addition to the MIPI standard.

The host 100 and the display driver integrated chip 200 may communicate with each other through an interface 110. In various embodiments of the present disclosure, the interface 110 is a MIPI interface connecting the MIPI transmitter 102 of the host 100 and a MIPI receiver 201 of the display driver integrated chip 200 to each other, and may include one clock lane and one or more data lanes. The clock lane may transmit a clock signal CLK having different frequencies and different swing levels according to an operation mode (e.g., a low power mode and a high speed mode) to the display driver integrated chip 200. Each data lane may transmit processed input image data DATA1 having different frequencies and different swing levels according to an operation mode to the display driver integrated chip 200.

The display driver integrated chip 200 may process processed input image data DATA1 received from the host 100 through the interface 110, and control an image corresponding to a result obtained by processing the processed input image data DATA1 to be output to the display panel 300.

In accordance with an embodiment of the present disclosure, the display driver integrated chip 200 may include the MIPI receiver 201, a second memory 202, a logic circuit 203, a compensator 204, a timing controller 205, a scan driver 207, a data driver 208, and an error detector 209.

The MIPI receiver 201 may receive a clock signal CLK and the processed input image data DATA1 from the host 100 through the interface 110. The MIPI receiver 201 may include one clock lane module and one or more data lane modules.

The second memory 202 may be connected to the first memory 400. Each of the first memory 400 and the second memory 202 may store compensation data CD of the processed input image data DATA1.

For example, the first memory 400 may be implemented as a nonvolatile memory device such as an Erasable Programmable Read-Only Memory (EPROM), an Electrically Erasable Programmable Read-Only Memory (EEPROM), a flash memory, a Phase Change Random Access Memory (PRAM), a Resistive Random Access Memory (RRAM), a Nano Floating Gate Memory (NFGM), a Polymer Random Access Memory (PoRAM), a Magnetic Random Access Memory (MRAM), or a Ferroelectric Random Access Memory (FRAM), and the second memory 200 may be implemented as a volatile memory device such as a Dynamic Random Access Memory (DRAM) or a Static Random Access Memory (SRAM).

When the display device 1000 is powered on, the second memory 202 may load compensation data CD of the processed input image data DATA1, which is stored in the first memory 400. The compensation data CD in the second memory 202 may be uploaded periodically or before the display device 1000 is powered off to the first memory 400.

The compensation data CD in the second memory 202 may be transmitted to a third memory 206 of the compensator 204 under the control of the logic circuit 203. The compensator 204 may include the third memory 206. For example, the third memory 206 may be implemented as a volatile memory device such as a Static Random Access Memory (SRAM). The third memory 206 may be connected to the second memory 202 through a memory interface.

The compensator 204 may calculate output image data DATA2 by reflecting the compensation data CD to the processed input image data DATA1. In some embodiments, the compensator 204 may calculate compensation data CD about the processed input image data DATA1 by using at least one of an optical compensation technique, a degradation compensation technique, and a luminance reduction technique, and compensate the processed input image data DATA1 by using the compensation data CD, thereby generating the output image data DATA2.

In the optical compensation technique (e.g., Almost Short Range Uniformity (ARSU)), a luminance of the display device 1000 may be measured through a luminance measurement device in a process of manufacturing the display device 1000 (or the display panel 300), compensation data CD for compensating a luminance deviation for each area (or for each pixel) of the display device 1000 may be determined and stored in the first memory 400 based on a luminance deviation of the display device 1000, and a voltage value may be compensated by using pre-stored compensation data CD. The compensation data CD may include a gain and an offset, which represent a relationship between a grayscale value and a luminance for each area of the display device 1000, and be stored in the form of a lookup table in the third memory 206.

In the degradation compensation technique (e.g., Image Sticking Compensation (ISC)), stress data (stress profile or accumulated data) may be generated by accumulating a driving time and/or a grayscale value for each pixel, compensation data CD may be calculated based on a predetermined lifetime curve and the stress data, and a voltage value may be compensated based on the calculated compensation data CD. The predetermined lifetime curve represents degradation degree according to lapse of time and the compensation data CD along with the stress data may be stored in the form of a separate lookup table in the third memory 206.

In the luminance reduction technique (e.g., Logo Factor (LF)), a specific area having a condition in which degradation is accelerated in the display panel 300 (e.g., an area corresponding to a logo) may be detected, and a voltage value corresponding to the detected area may be decreased by a predetermined ratio or a predetermined value. Alternatively, in the luminance reduction technique, the display panel 300 may include a central area and an outer area surrounding the same, and a voltage value corresponding to the outer area may be decreased. Compensation data CD may include a gain and an offset of the voltage value corresponding to the detected specific area of the display device 1000 and be stored in the form of a lookup table in the third memory 206.

That is, the compensator 204 may calculate the output image data DATA2 by compensating for the processed input image data DATA1, using various digital compensation techniques such as the optical compensation technique, the degradation compensation technique, and the luminance reduction technique.

The timing controller 205 may receive the output image data DATA2 from the compensator 204 and transmit the received output image data DATA2 to the display panel 300 (or the data driver 208). Also, the timing controller 205 may receive the clock signal CLK from the MIPI receiver 201 (or the host 100). The timing controller 205 may generate a scan control signal SCS and a data control signal DCS in response to the clock signal CLK.

The scan driver 207 may generate a scan signal in response to the scan control signal SCS and sequentially provide the scan signal to scan lines SL1 to SLn. The scan control signal SCS may include a start signal, clock signals, and the like, and be provided from the timing controller 205. For example, the scan driver 207 may include a shift register which sequentially generates and outputs the scan signal having a pulse form corresponding to the start signal having a pulse form by using the clock signals.

The data driver 208 may generate data signals based on the output image data DATA2 and the data control signal DCS, which are provided from the timing controller 205, and provide the data signals to the display panel 300 (or a pixel PX). The data control signal DCS is a signal for controlling an operation of the data driver 208 and may include a load signal (or data enable signal) instructing output of a valid data signal, and the like.

The display panel 300 may include the scan lines SL1 to SLn (n is a positive integer), data lines DL1 to DLm (m is a positive integer), and pixels PX. The pixels PX may be provided in areas (e.g., pixel areas) defined by the scan lines SL1 to SLn and the data lines DL1 to DLm.

Each of the pixels PX may be connected to one of the scan lines SL1 to SLn and one of the data lines DL1 to DLm. For example, a pixel PX provided in an area in which a first scan line SL1 and a first data line DL1 may be connected to the first scan line SL1 and the first data line DL1.

The pixel PX may include a light emitting element and at least one transistor. The at least one transistor may transfer a current (or a current amount) corresponding to a data signal provided through a data line to the light emitting element in response to a scan signal provided through a scan line, and the light emitting element may emit light with a luminance corresponding to the current flowing through the light emitting element (i.e., a luminance corresponding to the data signal). The light emitting element may include an organic light emitting diode.

Meanwhile, in the display device 1000, an error may occur in the compensation data CD written in the first memory 400, the second memory 202, and the third memory 206 due to noise caused by an Electro-Static Discharge (ESD). For example, when the logic circuit 203 influenced by the noise caused by the ESD, a malfunction of the logic circuit 203 may occur, and therefore, an error may occur in the compensation data CD written in the second memory 202. In addition, when the second memory 202 is influenced by the noise caused by the ESD, an error may occur in the compensation data CD written in the second memory 202. In addition, when data transmission from the second memory 202 to the third memory 206 is influenced by the noise caused by the ESD, an error may occur in the compensation data CD written in the third memory 206. As described above, when an error occurs in the compensation data CD due to the noise caused by the ESD, a distorted image, which is an image different from an image to be originally displayed, may be displayed on the display panel 300.

In order to solve this problem, the error detector 209 may check whether the compensation data CD respectively written in the first memory 400 and the third memory 206 are identical. Since the compensator 204 finally calculate the output image data DATA2 based on the compensation data CD written in the third memory 206, it is more efficient to verify whether or not the compensation data CD respectively written in the first memory 400 and the third memory 206 are identical than to verify whether or not the compensation data CD respectively written in the first memory 400 and the second memory 202 are identical.

The error detector 209 may receive a first error correction code CS1 of the compensation data CD from the first memory 400. Also, the error detector 209 may receive the compensation data CD from the third memory 206, and calculate a second error correction code by using the received compensation data. In accordance with an embodiment, the first error correction code CS1 and the second error correction code may be respectively a checksum value of the compensation data CD stored in the first memory 400 and a checksum value of the compensation data CD stored in the third memory 206. Checksum is a form of redundancy check and is a method of protecting integrity of data written in a memory through error correction.

The error detector 209 may compare the first error correction code CS1 and the second error correction code with each other. When the first error correction code CS1 accords with the second error correction code, an error detection operation may be ended. However, the present disclosure is not limited thereto, and the error detection operation may be repeatedly performed in a predetermined cycle as will be described later with reference to FIGS. 3 to 5. When the first error correction code CS1 is different from the second error correction code, the error detector 209 may provide a data rewriting signal RWS to the timing controller 205.

After receiving the data rewriting signal RSW from the error detector 209, the timing controller 205 may re-load the compensation data CD from the first memory 400 or sleep in/out the display device 1000. The sleep-in/out may mean that the host 100 maintains a turn-on state while turning off and then turning on the display driver integrated chip 200. When the display driver integrated chip 200 is turned off and then turned on, the display driver integrated chip 200 may re-load the compensation data CD from the first memory 400. That is, when the display device 1000 is slept in/out, the display driver integrated chip 200 may re-load the compensation data CD to the second memory 202 and the third memory 206 from the first memory 400.

Hereinafter, a detailed aspect of an error detection operation on the compensation data CD written in the third memory 206 will be described in detail with reference to FIGS. 3 to 5.

Figure 3:
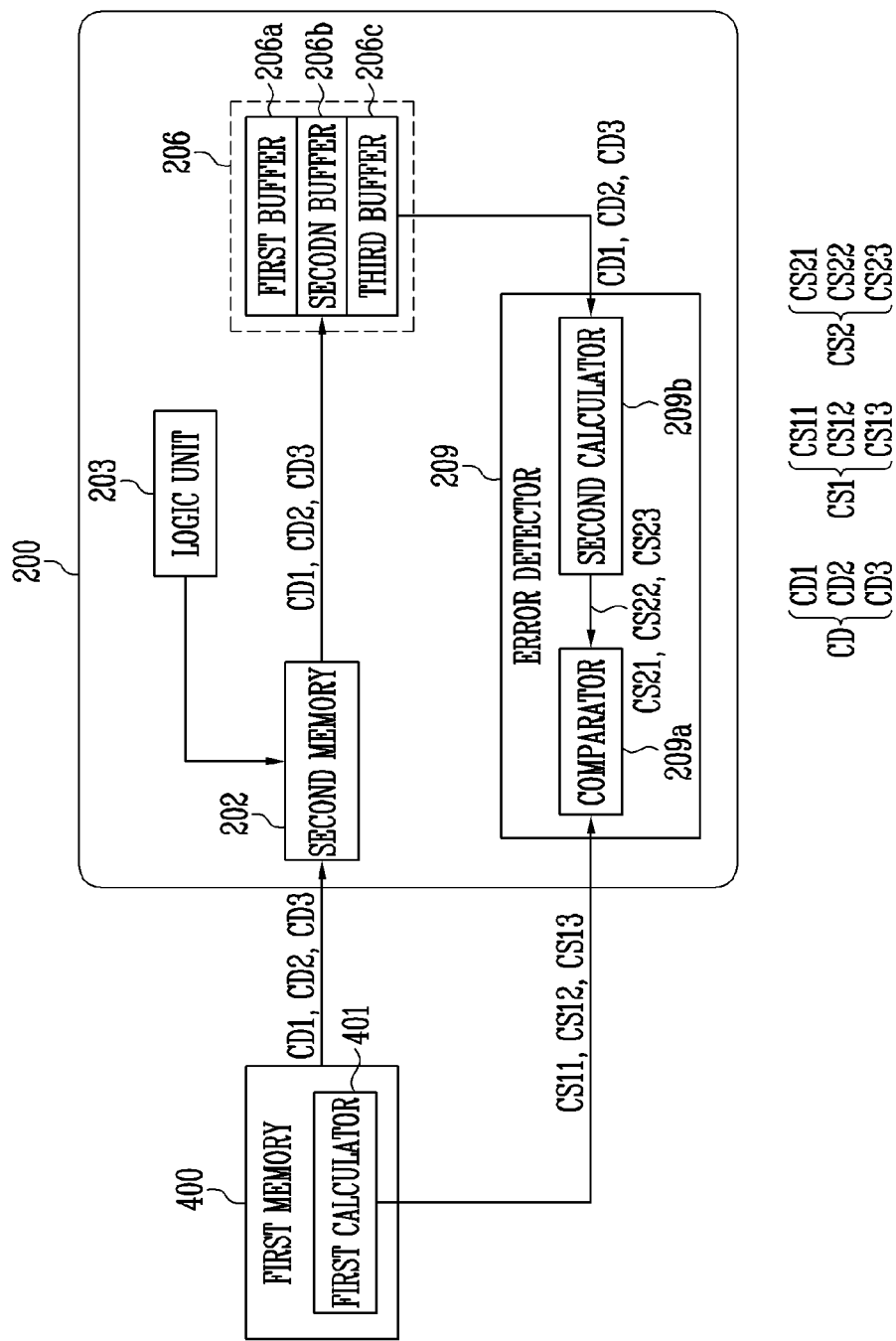
FIG. 3 is a block diagram illustrating an operation of an error detector in accordance with an embodiment of the present disclosure.

FIG. 3 is a block diagram illustrating an operation of the error detector in accordance with an embodiment of the present disclosure. FIG. 4 is a diagram illustrating an operation period of the error detector in accordance with an embodiment of the present disclosure.

Referring to FIG. 3, in accordance with an embodiment, the first memory 400 may include a first calculator 401. The first calculator 401 may calculate first error correction codes CS11, CS12, and CS13 with respect to respective compensation data CD1, CD2, and CD3 to be stored in each of a first buffer 206a, a second buffer 206b, and a third buffer 206c which will be described later. The first error correction codes CS11, CS12, and CS13 may be checksums of the respective compensation data CD1, CD2, and CD3 written in the first memory 400.

The display driver integrated chip 200 may load the compensation data CD1, CD2, and CD3 from the first memory 400 to the second memory during power-on or sleep-in/out of the display device 1000 (see FIG. 2).

The compensation data CD1, CD2, and CD3 may be periodically written in the third memory 206 from the second memory 202 in response to a control signal from the logic circuit 203.

The third memory 206 may include the first buffer 206a, the second buffer 206b, and the third buffer 206c. In accordance with an embodiment, each of the first to third buffers 206a, 206b, and 206c may include compensation data CD1, CD2, and CD3 corresponding to at least one horizontal line, which are transmitted from the second memory 202. For example, when the display panel 300 (see FIG. 2) has a Ultra High Definition (UHD) resolution having 3,840*2,160 pixels PX, each of the first to third buffers 206a, 206b, and 206c may include compensation data CD1, CD2, and CD3 corresponding to 720 horizontal lines. However, a number of the buffers (e.g., 206a, 206b, and 206c) included in the third memory 206 shown in FIG. 3 is merely illustrative, and the present disclosure is not limited thereto. In addition, the first calculator 401 of the first memory 400 may calculate first error correction codes (e.g., CS11, CS12, and CS13) with respect to respective compensation data (e.g., CD1, CD2, and CD3) corresponding to the number of the buffers (e.g., 206a, 206b, and 206c).

In another embodiment, compensation data CD may be written to each of the first to third buffers 206a, 206b, and 206c for each of the compensation techniques described above with reference to FIG. 2. For example, compensation data CD1 calculated by using the optical compensation technique may be written in the first buffer 206a, compensation data CD2 calculated by using the degradation compensation technique may be written in the second buffer 206b, and compensation data CD3 calculated by using the luminance reduction technique may be written in the third buffer 206c. As described above, when the compensation data CD1, CD2, and CD3 are written in the first to third buffers 206a, 206b, and 206c with respect to the respective compensation techniques, error correction for a specific compensation technique can be easily performed.

Figure 4:
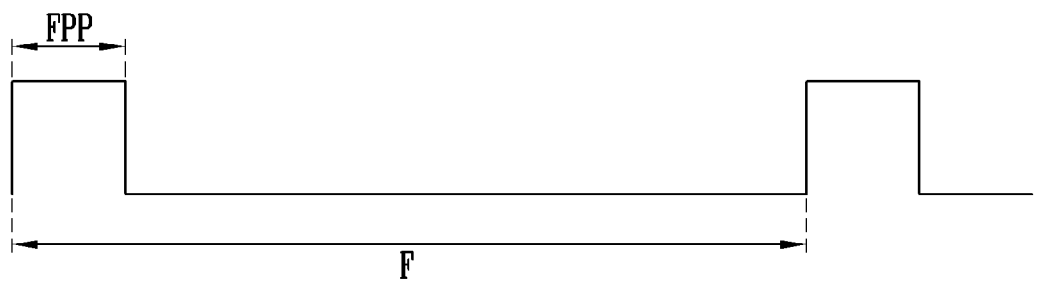
FIG. 4 is a diagram illustrating an operation period of the error detector in accordance with an embodiment of the present disclosure.

Referring to FIG. 4, one frame F may include a front porch period FPP after a beginning of the frame F. Although not shown in the drawing, the one frame F may further include a back porch period before an ending of the frame F. The front porch period FPP may mean a difference between the time at which the frame F is started and a time at which input of a data signal (or the output image data DATA2) is started, and the back porch period may mean a difference between a time at which the input of the data signal (or the output image data DATA2) is ended and the time at which the frame F is ended. In the front porch period FPP and the back porch period, the output image data DATA2 (see FIG. 2) may not be provided to the display panel 300 (or the pixel PX).

Referring to FIGS. 3 and 4, the error detector 209 may detect whether an error occurs in all compensation data CD stored in the third memory 206 in a predetermined cycle. The predetermined cycle may include a plurality of frames F. For example, the predetermined cycle may be five frames F or ten frames F. However, the predetermined cycle is not limited thereto, and may be variously set such that a user of the display device 1000 does not recognize a defect of an image displayed on the display panel 300 (see FIG. 2).

In accordance with an embodiment, during one front porch period FPP, the error detector 209 may detect whether an error has occurred in the compensate data CD stored in the third memory 206 by calculating second error correction codes CS21, CS22, and CS23 with respect to compensation data (e.g. CD1, CD2, and CD3) written in one buffer (e.g., 206a, 206b or 206c), using a second calculator 209b, and comparing the calculated second error correction codes CS21, CS22, and CS23 with the first error correction code CS1 pre-calculated by the first calculator 401, using a comparator 209a. The second error correction codes CS21, CS22, and CS23 may be checksums with respect to the respective compensation data CD1, CD2, and CD3 written in the third memory 206. Subsequently, when it is determined that an error has occurred in compensate data (e.g., CD1, CD2, and CD3) written in one buffer (e.g., 206a, 206b or 206c), the display driver integrated chip 200 (or the second memory 202) may re-load the compensation data from the first memory 400 during a front porch period FPP of the same frame F. As described above with reference to FIG. 2, when it is determined that an error has occurred in the compensate data (e.g., CD1, CD2, and CD3) written in one buffer (e.g., 206a, 206b or 206c), the error detector 209 may provide the data rewriting signal RWS to the timing controller 205, and the timing controller 205 receiving the data rewriting signal RWS may re-load the compensation data CD from the first memory 400 or sleep in/out the display device 1000.

Meanwhile, the size of the compensate data (e.g., CD1, CD2, and CD3) written in one buffer (e.g., 206a, 206b or 206c) may be set such that a time obtained by adding up a time required to calculate second error correction codes (e.g., CS21, CS22, and CS23) with respect to the compensate data (e.g., CD1, CD2, and CD3) written in one buffer (e.g., 206a, 206b or 206c) and a time required to re-load the compensation data CD from the first memory 40 when an error occurs is smaller than one front porch period FPP. For example, when the display device 1000 (see FIG. 2) is driven 60 Hz, the time of one frame F may be 16.7 ms, and the front porch period FPP may be set to 1 ms. Therefore, the size of the compensate data (e.g., CD1, CD2, and CD3) written in one buffer (e.g., 206a, 206b or 206c) may be set such that the second error correction codes (e.g., CS21, CS22, and CS23) can be calculated and the compensation data CD can be re-loaded from the first memory 400 during the front porch period FPP when an error occurs.

Referring to the following Table 1, when an error of compensation data CD is detected during the predetermined cycle, for example during every five frames, the error detector 209 may detect whether an error has occurred in the compensation data CD1 written in the first buffer 206a during a front porch period FPP of a first frame 1F, detect whether an error has occurred in the compensation data CD2 written in the second buffer 206b during a front porch period FPP of a second frame 2F, and detect whether an error has occurred in the compensation data CD3 written in the third buffer 206c during a front porch period FPP of a third frame 3F.

Subsequently, the error detector 209 may not detect whether an error has occurred in compensation data CD in a fourth frame 4F and a fifth frame 5F. The process may be repeated during next sixth to tenth frames 6F to 10F. Similarly, the process may be repeated during every five frames as a cycle. When an error is detected in compensation data CD in each frame, re-loading of the compensation data CD may be immediately performed from the first memory 400 during a porch period of the corresponding frame.

TABLE 1

| Frame | 1F | 2F | 3F | 4F | 5F | 6F | 7F | 8F | 9F | 10F | ... |
|---|---|---|---|---|---|---|---|---|---|---|---|
| Error Detection | CD1 | CD2 | CD3 | X | X | CD1 | CD2 | CD3 | X | X | |

In another example, as shown in the following Table 2, when an error of compensation data CD is detected during the predetermined cycle, for example during every ten frames, the error detector 209 may detect whether an error has occurred in the compensation data CD1 written in the first buffer 206a during a front porch period FPP of a first frame 1F, detect whether an error has occurred in the compensation data CD2 written in the second buffer 206b during a front porch period FPP of a second frame 2F, and detect whether an error has occurred in the compensation data CD3 written in the third buffer 206c during a front porch period FPP of a third frame 3F.

Subsequently, the error detector 209 may not detect whether an error has occurred in compensation data CD in a fourth frame 4F and a tenth frame 10F. Similarly, the process may be repeated during every ten frames as a cycle. When an error is detected in compensation data CD in each frame, re-loading of the compensation data CD may be immediately performed from the first memory 400 in a porch period of the corresponding frame.

TABLE 2

| Frame | 1F | 2F | 3F | 4F | 5F | 6F | 7F | 8F | 9F | 10F | ... |
|---|---|---|---|---|---|---|---|---|---|---|---|
| Error Detection | CD1 | CD2 | CD3 | X | X | X | X | X | X | X | |

As described above, when it is detected whether an error has occurred in the compensation data CD stored in the third memory 206 in a predetermined cycle, power consumption can be reduced as compared with when an error is consecutively detected.

In accordance with another embodiment of the present disclosure, during one frame F except a front porch period FPP, the error detector 209 may detect whether an error has occurred in compensation data CD by calculating second error correction codes (e.g., CS21, CS22, and CS23) with respect to compensation data (e.g., CD1, CD2, and CD3) written in one buffer (e.g., 206a, 206b or 206c), using the second calculator 209b, and comparing the calculated second error correction codes (e.g., CS21, CS22, and CS23) with the first error correction code CS1 pre-calculated by the first calculator 401 using the comparator 209a. The second error correction codes CS21, CS22, and CS23 may be checksums with respect to the respective compensation data CD1, CD2, and CD3 written in the third memory 206.

Subsequently, when it is determined that an error has occurred in compensation data (e.g., CD1, CD2, and CD3) written in buffers (e.g., 206a, 206b, and 206c), the display driver integrated chip 200 (or the second memory 202) may re-load the compensation data CD from the first memory 400 in a front porch period FPP of a next frame F. As described above with reference to FIG. 2, when it is determined that an error has occurred in compensation data (e.g., CD1, CD2, and CD3) written in one buffer (e.g., 206a, 206b or 206c), the error detector 209 may provide the data rewriting signal RWS to the timing controller 205, and the timing controller 205 may re-load the compensation data CD from the first memory 400 or sleep in/out the display device 1000 in response to the data rewriting signal RWS.

The size of the compensate data (e.g., CD1, CD2, and CD3) written in one buffer (e.g., 206a, 206b or 206c) may be set such that a time required to calculate second error correction codes (e.g., CS21, CS22, and CS23) with respect to the compensate data (e.g., CD1, CD2, and CD3) written in one buffer (e.g., 206a, 206b or 206c) is smaller than one frame period F except a front porch period FPP. For example, when the display device 1000 (see FIG. 2) is driven 60 Hz, the time of one frame F may be 16.7 ms, and the front porch period FPP may be set to 1 ms. Therefore, the size of the compensate data (e.g., CD1, CD2, and CD3) written in one buffer (e.g., 206a, 206b or 206c) may be set such that the second error correction codes (e.g., CS21, CS22, and CS23) can be calculated during 15.7 ms.

Figure 5:
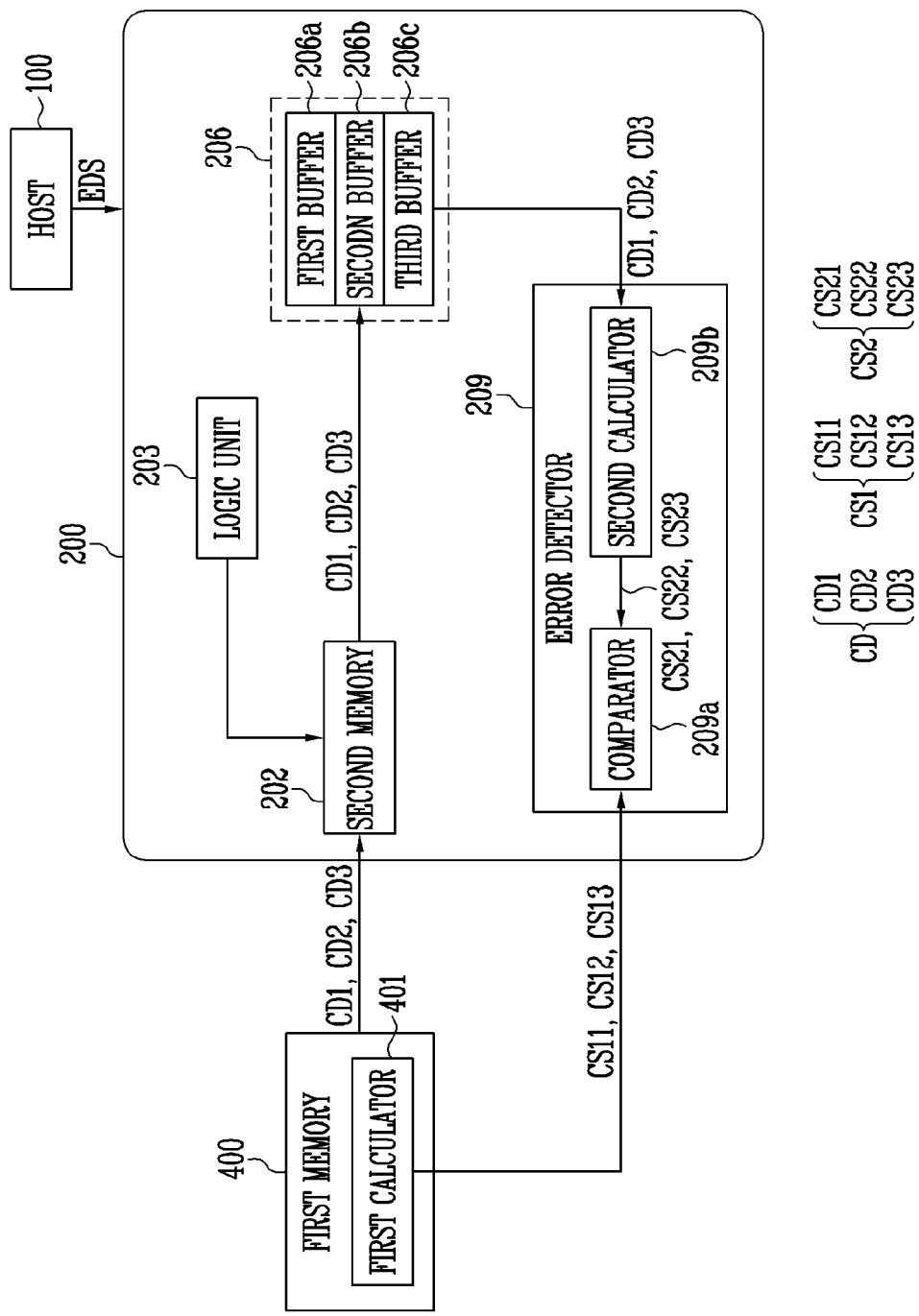
FIG. 5 is a block diagram illustrating an operation of the error detector in accordance with another embodiment of the present disclosure.

FIG. 5 is a block diagram illustrating an operation of the error detector in accordance with another embodiment of the present disclosure.

The embodiment shown in FIG. 5 is different from the embodiment shown in FIG. 3, in which the error detection operation is performed on all the buffers 206a, 206b, and 206c in the predetermined cycle, in that the error detection operation is non-cyclically and selectively performed in response to a control signal from a host. Hereinafter, overlapping descriptions will be omitted, and the host 100 will be mainly described.

Referring to FIG. 5, in accordance with an embodiment, the host 100 may provide the display driver integrated chip 200 with an error detection signal EDS instructing the display driver integrated chip 200 to perform error detection on at least one of compensation data CD1, CD2, and CD3 written in the buffers 206a, 206b, and 206c. Although a case where the error detection signal EDS is provided to the display driver integrated chip 200 has been illustrated in FIG. 5, the error detection signal EDS may be provided to the timing controller 205 and the timing controller 205 may provide the error detector 209 with a signal instructing the error detector 209 to perform the error detection operation.

For example, the host 100 may provide the display driver integrated chip 200 with the error detection signal instructing the display driver integrated chip 200 to perform error detection on the compensation data CD1 written in the first buffer 206a. When the size of the compensation data CD used in the compensator 204 (see FIG. 2) is large, the error detection operation may be selectively performed for at least one selected error correction code among the second error correction code CS21, CS22, and CS23 for each of the buffers 206a, 206b, and 206c. In addition, when an error is recognized in a specific compensation technique, the error detection operation is performed on only a buffer (e.g., 206a, 206b or 206c) in which compensation data CD with respect to the corresponding compensation technique is written, so that a prompt error correction effect can be expected.

In accordance with another embodiment of the present disclosure, when a specific event occurs, the host 100 may provide the display driver integrated chip 200 with the error detection signal EDS instructing the display driver integrated chip 200 to perform error detection on at least one of the compensation data CD1, CD2, and CD3 written in the buffers 206a, 206b, and 206c. The specific event may mean a case where an application has a high probability of an Electro-Static Discharge (ESD).

For example, the display device 1000 (see FIG. 2) may include a camera module. An ESD may occur before/after an operation of the camera module, and therefore, an error may occur in the compensation data CD written in the second memory 202 and/or the third memory 206. When a camera application is executed, the host 100 may provide the display driver integrated chip 200 with the error detection signal EDS instructing the display driver integrated chip 200 to perform error detection on at least one of the compensation data CD1, CD2, and CD3 written in the buffers 206a, 206b, and 206c. An effect that error detection and correction on the compensation data CD1, CD2, and CD3 written in the buffers 206a, 206b, and 206c can be promptly performed when a specific event is expected.

Figure 6:
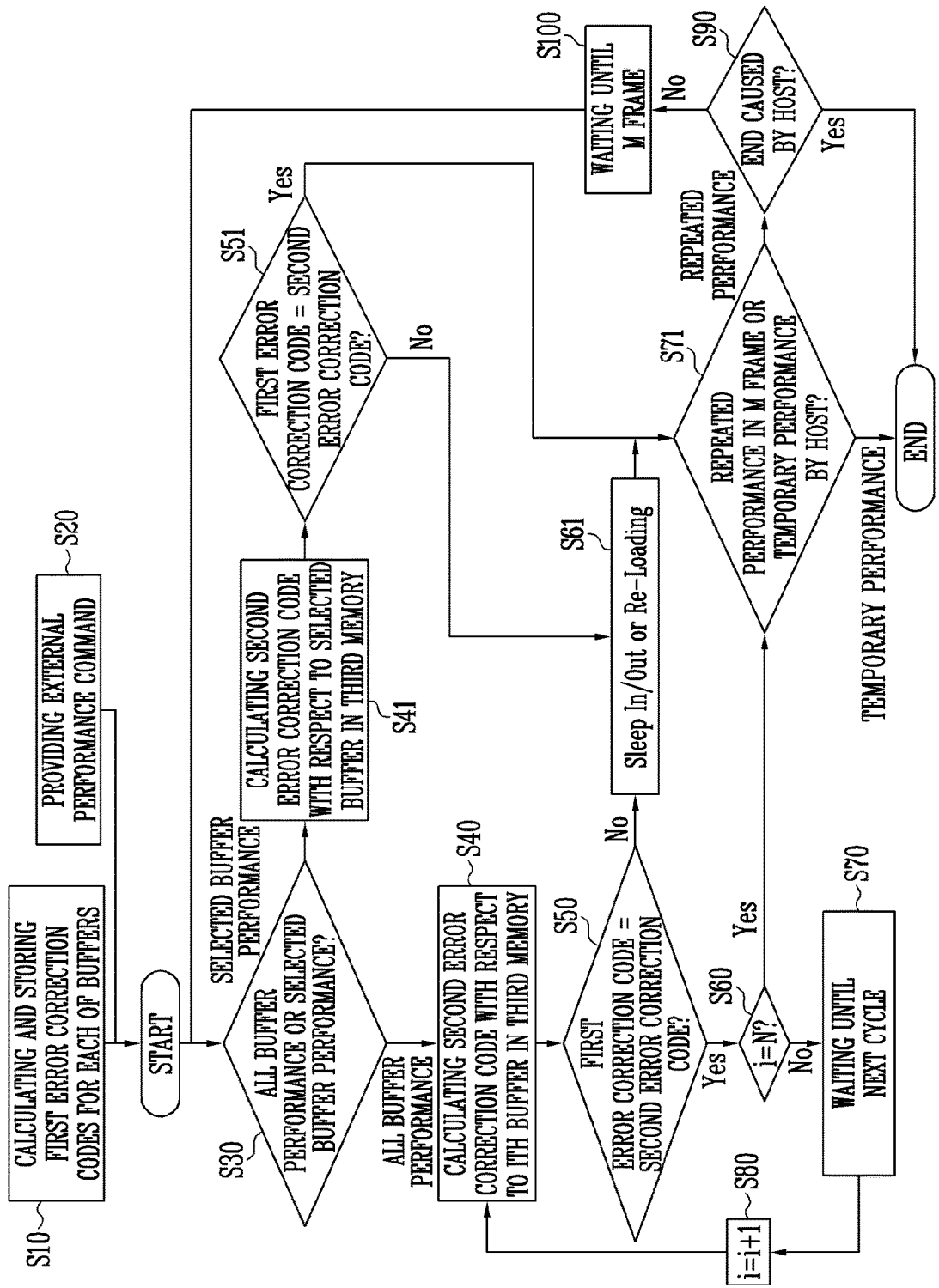
FIG. 6 is a flowchart illustrating an error detection method in accordance with an embodiment of the present disclosure.

FIG. 6 is a flowchart illustrating an error detection method in accordance with an embodiment of the present disclosure.

Referring to FIGS. 1 to 6, first, the first memory 400 may calculate and store first error correction codes CS11, CS12, and CS13 with respect to respective compensation data CD1, CD2, and CD3 to be stored in each of the first buffer 206a, the second buffer 206b, and the third buffer 206c by using the first calculator 401 (S10). The first error correction codes CS11, CS12, and CS13 may be checksums with respect to the respective compensation data CD1, CD2, and CD3 written in the first memory 400.

Next, an external performance command EDS may be provided to the display driver integrated chip 200 from the host 100 (S20). The external performance command EDS may be one instructing the error detector 209 to detect whether an error has occurred in all compensation data CD stored in the third memory 206 in a predetermined cycle as described above with reference to FIGS. 3 and 4. That is, the external performance command EDS may be a signal instructing a detection operation to be enabled according to a predetermined sequence.

Also, the external performance command EDS may be one instructing the display driver integrated chip 200 to detect an error of at least one of the compensation data CD1, CD2, and CD3 written in the buffers 206a, 206b, and 206c or to detect an error of at least one of the compensation data CD1, CD2, and CD3 written in the buffers 206a, 206b, and 206c when the specific event occurs as described above with reference to FIG. 5.

Next, it may be determined whether to detect errors for all the buffers 206a, 206b, and 206c included in the third memory 206 or to detect for some of the buffers 206a, 206b, and 206c included in the third memory 206 (S30). In accordance with an embodiment, the display driver integrated chip 200 (or the timing controller 205) may determine whether an error has occurred in all or some of the buffers 206a, 206b, and 206c in response to the external performance command EDS of the host 100 in the step S20.

Next, when it is determined to detect all the buffers 206a, 206b, and 206c, a second error correction code CS2 with respect to an ith buffer in the third memory 206 may be calculated (S40). Here, i may be a natural number from 1 to N. In accordance with an embodiment, as described with reference to FIGS. 3 and 4, the error detector 209 may calculate second error correction codes CS21, CS22, and CS23 with respect to compensation data (e.g., CD1, CD2, and CD3) written in one buffer (e.g., 206a, 206b or 206c) by using the second calculator 209b during one front porch period FPP. In accordance with another embodiment, the error detector 209 may calculate second error correction codes CS21, CS22, and CS23 with respect to compensation data (e.g., CD1, CD2, and CD3) written in one buffer (e.g., 206a, 206b or 206c) by using the second calculator 209b during one frame F. The second error correction codes CS21, CS22, and CS23 may be checksums with respect to the respective compensation data CD1, CD2, and CD3 written in the third memory 206.

Next, it may be determined whether a first error correction code CS1 and a second error correction code CS2 accord with each other (S50). The error detector 209 may detect whether an error has occurred in compensation data CD by comparing the first error correction code CS1 pre-calculated by the first calculator 401 with the second error correction code CS2 using the comparator 209a.

Next, when the first error correction code CS1 and the second error correction code CS2 accord with each other, it may be determined whether the ith buffer is an Nth buffer (S60). That is, the error detector 209 may determine whether the ith buffer is a last buffer 206c included in the third memory 206. In the embodiment shown in FIGS. 3 and 5, N is 3.

Next, when the ith buffer is not the last buffer 206c included in the third memory 206, the error detector 209 may wait until a next cycle starts (S70). For example, as shown in FIGS. 3 and 5, when the third memory 206 includes three buffers 206a, 206b, and 206c, an error detection operation on the second buffer 206b may start a frame next to a frame during which an error detection operation on the first buffer 206a is performed.

Next, the steps S40, S50, S60, and S70 may be repeatedly performed on an (i+1)th buffer (S80).

Meanwhile, in the step S30, when it is determined to detect an error in some of the buffers 206a, 206b, and 206c, a second error correction code CS2 with respect to a selected buffer among the buffers 206a, 206b, and 206c may be calculated (S41). In accordance with an embodiment, as described with reference to FIG. 5, the host 100 may provide the display driver integrated chip 200 with an error detection signal EDS instructing the display driver integrated chip 200 to perform error detection on at least one of the compensation data CD1, CD2, and CD3 written in the buffers 206a, 206b, and 206c. In accordance with another embodiment, the host 100 may provide the display driver integrated chip 200 with the error detection signal EDS instructing the display driver integrated chip 200 to perform error detection on at least one of the compensation data CD1, CD2, and CD3 written in the buffers 206a, 206b, and 206c when a specific event occurs. The specific event may mean a case where an application has a high probability of an Electro-Static Discharge (ESD).

Next, it may be determined whether the first error correction code CS1 and the second error correction code CS2 accord with each other (S51). The step SM is configured substantially identically to the step S50, and therefore, overlapping descriptions will be omitted.

Next, in the steps S50 and S51, when the first error correction code CS1 and the second error correction code CS2 do not accord with each other, the compensation data CD may be re-loaded from the first memory 400 (S61). As described above with reference to FIG. 2, the error detector 209 may provide a data rewriting signal RWS to the timing controller 206, when the first error correction code CS1 and the second error correction code CS2 are different from each other by comparing the first error correction code CS1 and the second error correction code CS2 with each other.

The timing controller 205 may re-load the compensation data CD from the first memory 400 or sleep in/out the display device 1000 in response to the data rewriting signal RWS from the error detector 209. The sleep-in/out may mean that the host 100 maintains a turn-on state while turning off and then turning on the display driver integrated chip 200. When the display driver integrated chip 200 is turned off and then turned on, the display driver integrated chip 200 may re-load the compensation data CD from the first memory 400. That is, when the display device 1000 is slept in/out, the display driver integrated chip 200 may re-load the compensation data CD to the second memory 202 and the third memory 206 from the first memory 400.

Next, when the first error correction code CS1 and the second error correction code CS2 accord with each other in the step S51, when the ith buffer is the Nth buffer in the step S60, and when the compensation data CD is re-loaded to the third memory 206 in the step S61, it may be determined whether the error detection operation is repeatedly performed in a predetermined cycle (M frame, M is a natural number) or is temporarily performed by the host 100 (S71). When the error detection operation is temporarily performed by the host 100, the display driver integrated chip 200 (or the error detector 209) may end the error detection operation.

Next, in the step S71, when it is determined that the error detection operation is repeatedly performed in the predetermined cycle (M frame, M is a natural number), it may be determined whether an end signal has been received from the host 100 (S90). When a signal notifying that the error detection operation is not required any more by the host 100 even though the error detection operation is repeatedly performed in the predetermined cycle (M frame, M is a natural number), the error detection operation may be ended.

Next, in the step S90, when the end signal is not received from the host 100, the error detector 209 may wait until the predetermined cycle (M frame), when a current frame is within the predetermined cycle (M frame) (S100). When the current frame exceeds the predetermined cycle (M frame), the error detector 209 may repeat the steps after the step S30. Referring to the above-described Table 1, the predetermined cycle M frame may be 5 frames. Referring to the above-described Table 2, the predetermined cycle M frame may be 10 frames.

As described above, compensation data CD written in the third memory 206 used to calculate output image data DATA2 which is provided to the display panel 300 is compared with compensation data CD stored in the first memory 400 disposed at the outside of the display driver integrated chip 200 to recover the compensation data CD when an error occurs. Accordingly, the display quality of the display device 1000 can be improved.

In the display device in accordance with the present disclosure, compensation data of image data stored in a flash memory and a buffer memory are compared with each other by using an error correction code (ECC). Thus, it can be determined whether an error has occurred in the compensation data of the image data, and the compensation data of the image data can be recovered when the error occurs.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
a host configured to provide input image data;
a first memory storing compensation data; and
a display driver integrated chip including a compensator converting input image data into output image data based on the compensation data,
wherein the display driver integrated chip includes:
a second memory receiving the compensation data from the first memory when the display device is power on;
a third memory included in the compensator, the third memory storing the compensation data received from the second memory; and
an error detector detecting an error in the compensation data stored in the third memory by comparing the compensation data stored in the first memory with the compensation data stored in the third memory.

2. The display device of claim 1, wherein the error detector compares a first error correction code received from the first memory and a second error correction code generated based on the compensation data stored in the third memory in a predetermined cycle.

3. The display device of claim 2, wherein the first error correction code is a first checksum of the compensation data stored in the first memory and the second error correction code is a second checksum of the compensation data stored in the third memory.

4. The display device of claim 3, wherein, when the first checksum and the second checksum do not accord with each other, the error detector generates a data rewriting signal instructing the compensation data to be re-loaded from the first memory to the second memory.

5. The display device of claim 1, wherein the error detector compares a first error correction code received from the first memory and a second error correction code generated based on the compensation data stored in the third memory in response to an error detection signal from the host.

6. The display device of claim 5, wherein, when the host detects that an electro-static discharge has occurred in the display driver integrated chip, the host provides the error detection signal.

7. The display device of claim 1, wherein the display driver integrated chip provides the output image data to a display panel a frame at a time.

8. The display device of claim 7, wherein the frame includes a porch period in which the output image data is not provided.

9. The display device of claim 8, wherein the third memory includes at least one buffer storing the compensation data.

10. The display device of claim 9, wherein a size of the compensation data stored in the at least one buffer is set such that a time obtained by adding up a time required to calculate a second error correction code which is generated based on the compensation data stored in the third memory with respect to the compensation data written in the at least one buffer and a time required to re-load the compensation data from the first memory to be smaller than the porch period.

11. The display device of claim 10, wherein the error detector performs both comparison of a first error correction code received from the first memory and a second error correction code generated based on the compensation data stored in the third memory and re-loading of the compensation data stored in the first memory in one porch period.

12. The display device of claim 9, wherein a size of the compensation data stored in the at least one buffer is set such that a time required to calculate a second error correction code which is generated based on the compensation data stored in the third memory with respect to the compensation data written in the at least one buffer to be smaller than a frame period except the porch period.

13. The display device of claim 12, wherein the error detector compares a first error correction code received from the first memory and a second error correction code generated based on the compensation data stored in the third memory in a first frame period, and performs re-loading of the compensation data stored in the first memory in a porch period included in a next frame of the first frame.

14. The display device of claim 9, wherein the first memory calculates a first error correction code corresponding to a size of the compensation data stored in the buffer.

15. The display device of claim 1, wherein the first memory is a nonvolatile memory device and each of the second memory and the third memory is a volatile memory device.

16. A data error detection method for a display panel comprising:
loading compensation data from a first memory to a second memory when the display device is power-on;
loading the compensation data from the second memory to a third memory included in a compensator; and
detecting an error in the compensation data stored in the third memory by comparing a first error correction code with respect to the compensation data stored in the first memory with a second error correction code with respect to the compensation data stored in the third memory.

17. The data error detection method of claim 16, wherein the detecting the error in the compensation data stored in the third memory includes comparing the first error correction code and the second error correction code in a predetermined cycle.

18. The data error detection method of claim 17, further comprising re-loading the compensation data from the first memory to the second memory when the first error correction code and the second error correction code do not accord with each other.

19. The data error detection method of claim 16, wherein a frame which is displayed in the display panel includes a porch period in which output image data is not provided.

20. The data error detection method of claim 19, wherein
the third memory includes at least one buffer storing the compensation data loaded to the third memory,
wherein a size of the compensation data stored in the at least one buffer is set such that a time obtained by adding up a time required to calculate the second error correction code with respect to the compensation data written in the buffer and a time required to re-load the compensation data from the first memory to be smaller than the porch period, or is set such that a time required to calculate the second error correction code with respect to the compensate data written in the buffer to be smaller than a frame period except the porch period.

* * * * *